US008112046B2

(12) United States Patent
DeShazo

(10) Patent No.: US 8,112,046 B2
(45) Date of Patent: Feb. 7, 2012

(54) WEARABLE ONE WAY TRANSFER DEVICE

(75) Inventor: Patrick George DeShazo, Mont Vernon, NH (US)

(73) Assignee: MITRE Corporation, McLean, VA (US)

( * ) Notice: Subject to any disclaimer, the term of this patent is extended or adjusted under 35 U.S.C. 154(b) by 470 days.

(21) Appl. No.: 12/365,598

(22) Filed: Feb. 4, 2009

(65) Prior Publication Data

US 2010/0197246 A1  Aug. 5, 2010

(51) Int. Cl.
*H04B 1/02* (2006.01)
*H04B 1/034* (2006.01)
(52) U.S. Cl. ............. 455/91; 455/98; 455/100; 455/128
(58) Field of Classification Search .......... 455/91, 455/98, 100, 128
See application file for complete search history.

(56) References Cited

U.S. PATENT DOCUMENTS

| 7,403,853 | B1 * | 7/2008 | Janky et al. ............. 701/220 |
| 7,609,203 | B2 * | 10/2009 | Dockemeyer et al. ... 342/357.42 |
| 7,920,891 | B2 * | 4/2011 | Kwak ..................... 455/550.1 |
| 2002/0188776 | A1 | 12/2002 | Houlberg |

FOREIGN PATENT DOCUMENTS

| EP | 1 580 934 | 9/2005 |
| EP | 1 843 611 | 10/2007 |

OTHER PUBLICATIONS

International Search Report and the Written Opinion of the International Searching Authority, International Patent Application No. PCT/US2010/23072, date of mailing Jun. 29, 2010, (15 pages).
Clegg et al. "Digital Geological Mapping With Tablet PC and PDA: A comparison" Computers and GeoSciences vol. 32 No. 10 (Dec. 2006), (pp. 1682-1698).
Riblett et al. "TacNet Tracker©: Built-In Capabilities for Situational Awareness" Security Technology, 2008. ICCST 2008 42$^{nd}$ Annual IEEE International Carnahan Conference, Oct. 13, 2008, (pp. 349-356).
Wang et al. "Implementing Mobile Ad Hoc Networking (MANET) Over Legacy Tactical Radio Links" Military Communications Conference, 2007. IEEE, Oct. 29, 2007, (pp. 1-7).

* cited by examiner

*Primary Examiner* — Kenneth B. Wells
(74) *Attorney, Agent, or Firm* — Proskauer Rose LLP

(57) ABSTRACT

A wearable, one-way transfer device component for use in a communications system that includes a first device coupled to a first communication network that receives and compiles global positioning data corresponding to the physical location of one or more objects, a first serial communication path for transmitting the global positioning data from the first device, the first serial communications path being unidirectional to prevent data from being transmitted to the first device, means for formatting the global positioning data received from the first serial path into a serial communication format, a second serial communication path for transmitting the formatted global positioning data to a second device associated with a second communication network, and a user replaceable means for providing power to the means for formatting the global positioning data.

17 Claims, 9 Drawing Sheets

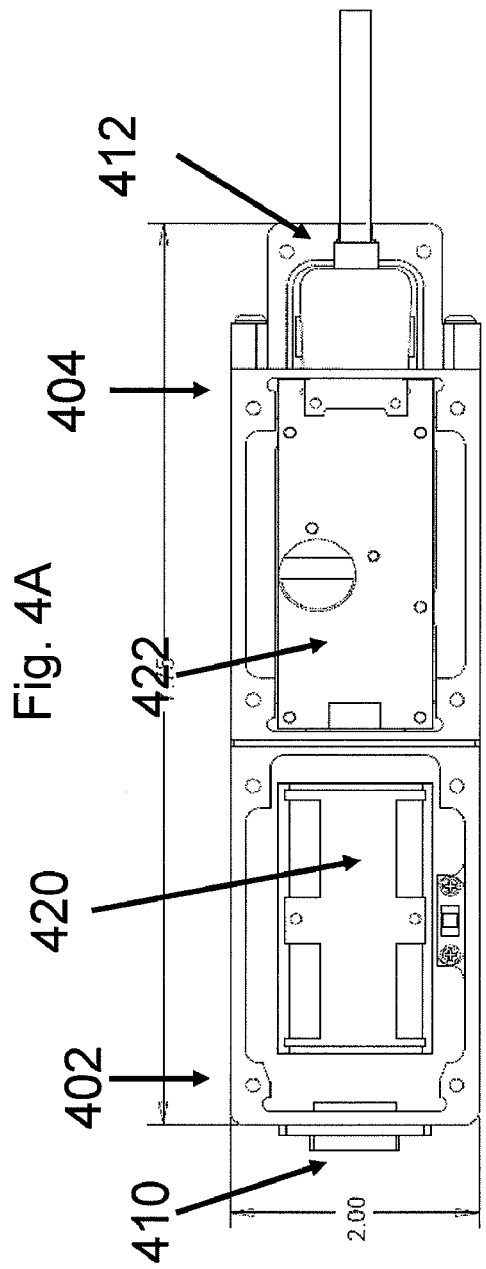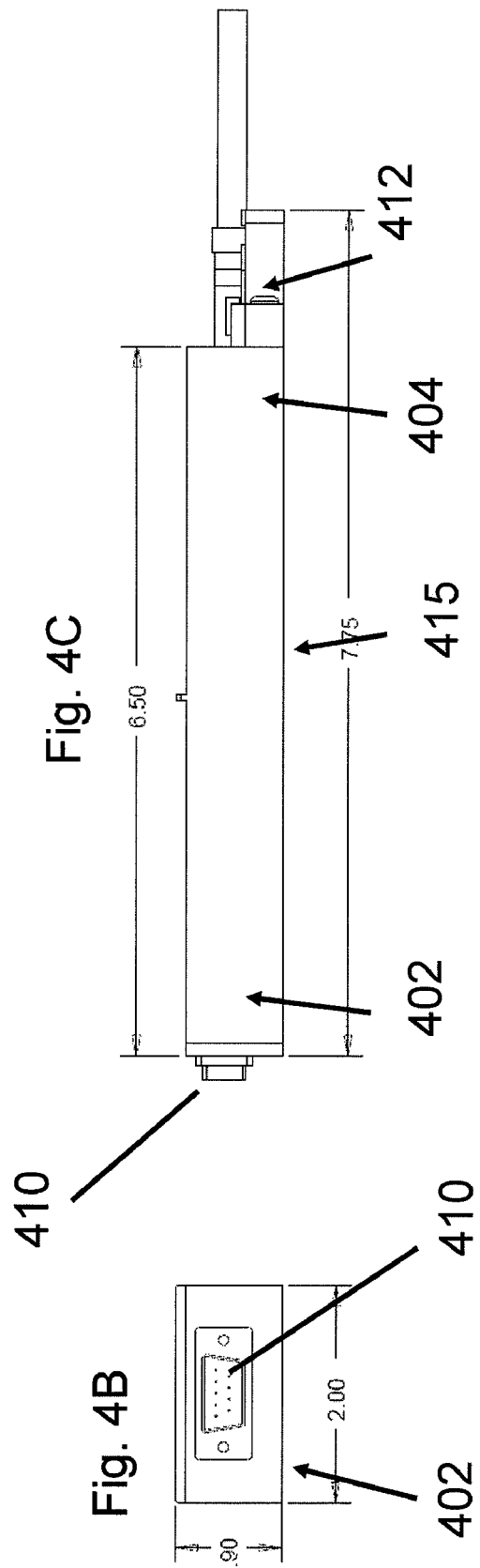

| Field | Example | Comments |
|---|---|---|
| Sentence ID | $GPGLL | |
| Latitude | 4250.5589 | ddmm.mmmm |
| N/S Indicator | S | N = North, S = South |
| Longitude | 14718.5084 | dddmm.mmmm |
| E/W Indicator | E | E = East, W = West |
| UTC Time | 092204.999 | hhmmss.sss |
| Status | A | A = Valid, V = Invalid |
| Checksum | *2D | |
| Terminator | CR/LF | |

$GPGLL,4250.5589,S,14718.5084,E,092204.999,A*2D ← 804

WEARABLE ONE WAY TRANSFER DEVICE

This invention was made with government support under Project No. 0708M430-CD awarded by the United States Army. The government may have certain rights in the invention.

TECHNICAL FIELD

This invention relates generally to apparatus and methods of wearable one way transfer devices for real-time, point-to-point communication and data transfer from a lower-security device to a higher-security communication network.

BACKGROUND

Modern armies continue to lack a secure and reliable method of collecting and transmitting individual locations to a classified or NSA-certified tactical communications network that is accessed by the chain of command. Despite the importance of this information, and the relative ease in determining individual locations with modern GPS locators, the security liabilities inherent in opening a secured network to lower-security communication devices carried by dismounted soldiers prevents the transfer of the information.

Most dismounted soldiers, if they have any handheld radio at all, have a Type 3 radio that transmits over a generally secured network. Although Type 3 radio technical specification are capable of communicating over an NSA-certified, tactical communication network ("tactical network"), Type 3 radios are not allowed to patch into the tactical networks, scanned by the chain of command, because the Type 3 radios do not carry NSA certification, and are therefore considered a potential security liability. Tactical networks generally utilize Type 1 radio which are also NSA-certified. Type 1 radios, however, are expensive, so each platoon generally is issued only a single Type 1 radio that is operated by the platoon's radio operator. This traditional deployment of the unit's radio leaves the unit's remaining dismounted soldiers and marines without a communication device or tracking mechanism directly connected to the larger tactical network. As a result, the chain of command forfeits significant information gathering about the individual location and movement of each dismounted soldier. Additionally, dismounted soldiers are faced with the inherent dangers that result from limited communication capabilities with other soldiers and the chain of command.

Currently, as shown in FIG. 1, communication from a Type 3 radio (101) to a secured, NSA-certified tactical communication network had to be patched through to a larger network which contains, for example, a computer 102 for monitoring the one way transfer from the Type 3 radio 101 to the tactical network 117. The computer 102 is usually housed in a secure base location, often located a long distance from the soldiers' area of operations. This long distance data transfer prevents point-to-point communication and real-time data collection from Type 3 radios 101 over a tactical network 117. Furthermore, the communication from the radios 101 to the co-located radios 115 have to be routed out to the computer 102, through the tactical communication network 117 and then back to the radios 115 that are part of the tactical network 117. This circuitous route is necessary even if the soldier holding the radio 101 is standing in close proximity, e.g., less than 20 meters, from a second soldier holding the second radio 115.

SUMMARY OF THE INVENTION

The present invention provides for a wearable, one way transfer device that allows point-to-point communication from a lower-security radio or communication devices to co-located higher-security radio devices coupled to a higher-security communication network. It also is light weight with a small footprint so as to add minimal bulk to the equipment requirements of a dismounted soldier or marine. Simultaneously the invention eliminates the security liabilities inherent in data transfers between communication networks of varying security level.

In one aspect, the invention features a component for use in a communications system. The component can include a first device coupled to a first communication network that receives and compiles global positioning data corresponding to the physical location of one or more objects and a first serial communication path for transmitting the global positioning data from the first device, the first serial path being unidirectional to prevent data from being transmitted to the first device. The component can also include means for formatting the global positioning data received from the first serial path into a serial communication format and a second serial communication path for transmitting the formatted global positioning data to a second device associated with a second communication network. The component can further include a user replaceable means for providing power to the means for formatting the global positioning data.

In another aspect, the invention features a point to point communication system. The point-to-point communications system can include a first device coupled to a first communication network that receives and compiles data and a first serial communication path for receiving the data from the first device, the first serial path being unidirectional to prevent data from being transmitted to the first device along the first serial communication path. The point-to-point communications system can further include means for formatting the data received from the first device through the first serial path into a serial communication protocol, a second device coupled to a second communication network, and a second serial communication path that transmits the formatted data from the means for formatting to the second device. The point-to-point communication system can also include a user accessible means for providing power to the means for formatting the data.

In a further aspect, the invention features a method for transmission of data from a first network to a second network. The method for transmitting data can include receiving global positioning data from a first device through a first serial communication path, the first serial communications path being unidirectional such that data can not be transmitted to the first device, formatting the global positioning data into a serial communication format, confirming that the formatted global positioning data conforms to preset rules, and transmitting the formatted global positioning data through a second serial communication path to a second device that is part of a second network.

And in another aspect, the invention features a system. The system can include a first device coupled to a first communication network. The first device can include a first serial communication path for transmitting data received at the first device from the first communication network, the first serial path being unidirectional to prevent data from being transmitted from the first device to the first communication network, means for formatting the data received from the first communications network into a serial communications format, a second serial communications path for transmitting the formatted data from the means for formatting the data, and a user accessible means for providing power to the means for formatting the data. The system can also include a second device coupled to a second communication network. The second device can include a means for receiving the formatted data from the second serial communications path of the first radio, and a means for transmitting the formatted data to the second communication network.

Any of the aspects described above can include one or more of the following features. In some embodiments the first device is a hand-held radio, and in some embodiments the second device is a hand-held radio. In some embodiments the means for formatting the global positioning data is disposed within the first device. And in some embodiments the means for formatting the global positioning data is contained within an enclosure that is physically separate from the first device, and the first device and the enclosure are connected through the first serial path. The means for formatting the global positioning data can also be sealed within the enclosure. And in other embodiments, the means for formatting the global positioning data is a field programmable gate array. In some embodiments the means for formatting the global positioning data can be worn or carried by a user, in some embodiments it is portable, and in some embodiments, it is hand-held. In some embodiments, the formatted global positioning data conforms to preset rules.

The aspects above can include one or more of the following features. In some embodiments the second serial path is a two way transfer path that allows data to be transmitted in two directions between the means for formatting the global positioning data and the second communications network.

In some embodiments the global positioning data corresponds to the position of a single individual. In some embodiments the global positioning data corresponds to the physical location of one or more individuals. And in some embodiments the global positioning data of one or more individuals is transmitted to the second communications network. The global positioning data can also be formatted in an American Standard Code for Information Interchange ASCII) serial communication protocol. The ASCII, serial communication protocol can conform to NMEA specifications. And in some embodiments the formatted data conforms to preset rules.

Any of the aspects above can include the feature where the user replaceable means for providing power is one or more batteries of about 400 mAh to about 3000 mAh.

The aspects above can include one or more of the following features. In some embodiments the first device is a Type 3 radio. In some embodiments the first device is a PDA. In some embodiments the first device is a first-responder radio. In some embodiments the first device receives and compiles data from one or more devices that are part of the first communications network. In some embodiments the second device is a Type 1 radio.

The aspects above can also include one or more of the following features. Power can be provided with a user accessible and replaceable means housed within the enclosure. And in some embodiments transmitting the formatted global positioning data can also include transmitting the formatted global positioning data that conforms to preset rules. And in further embodiments the rules can include only transmitting formatted global positioning data corresponding to a physical location that falls within a predetermined area of operations.

The foregoing and other objects, aspects, features, and advantages of the invention will become more apparent from the following description and from the claims.

BRIEF DESCRIPTION OF THE DRAWINGS

FIG. 4A shows a top-view perspective of the inside of a WOWT device chassis.
FIG. 4B shows an end-view of a WOWT device chassis.
FIG. 4C shows an alternative side view of a WOWT device chassis.
FIG. 8 shows a sample data sentence transmitted by a WOWT to a tactical network.

Similar numbers refer to similar parts throughout the drawings.

DETAILED DESCRIPTION

Figure 1:
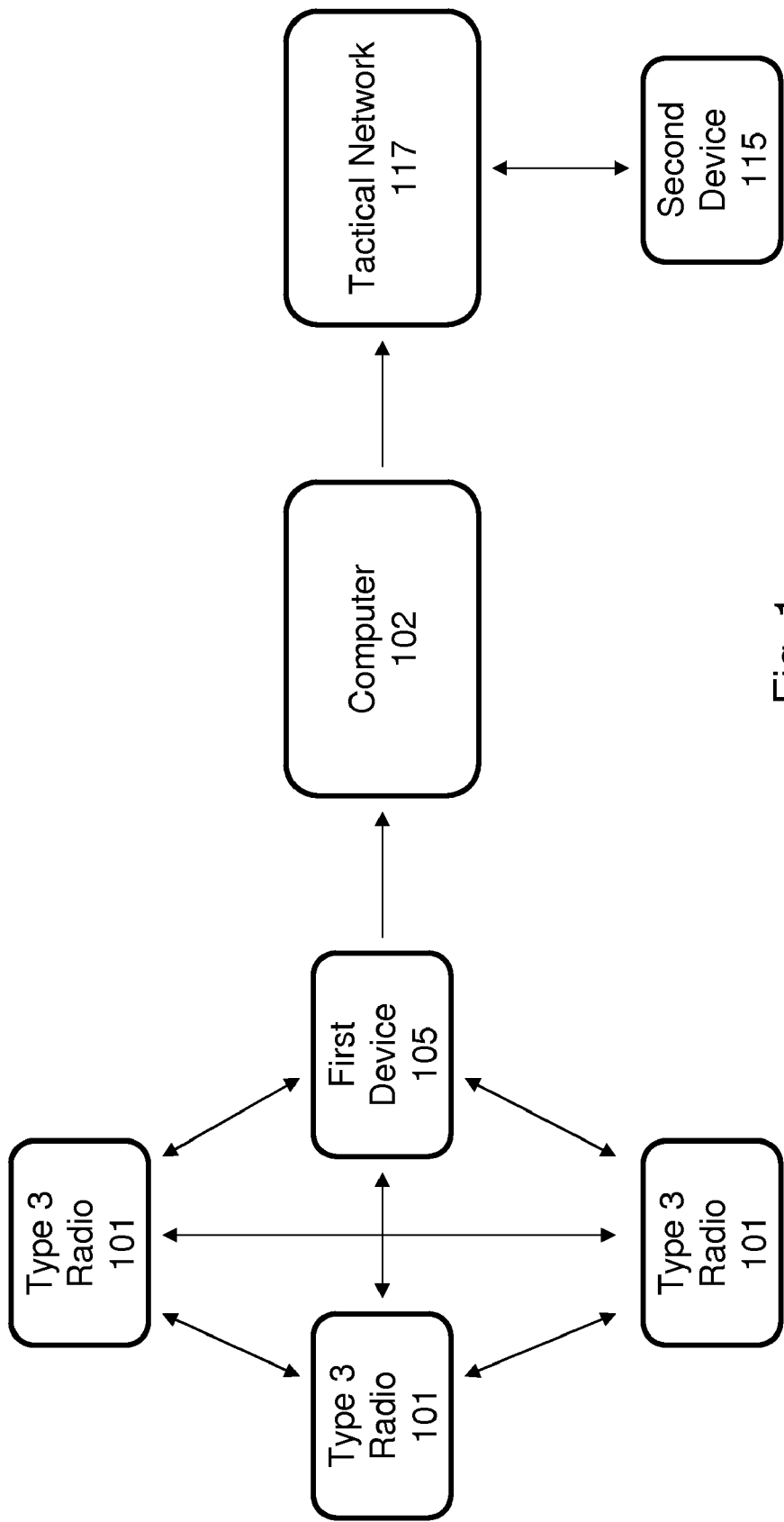
FIG. 1 shows a data transfer using a prior art method.
Figure 2:
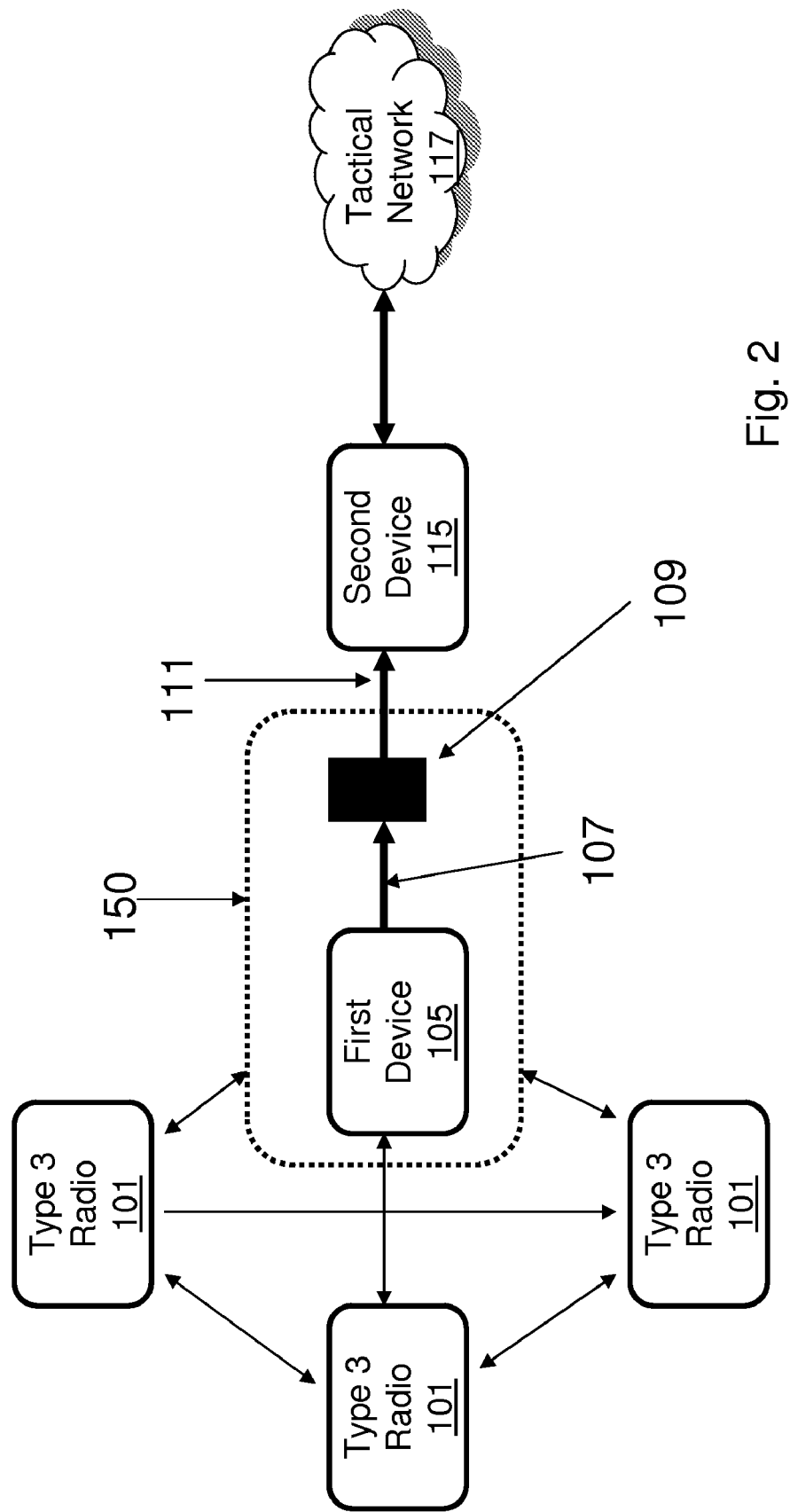
FIG. 2 shows the WOWT used in a system set-up.

The present invention is directed to point-to-point communication, that is in most cases a direct connection, between a first, lower security communication device, and a second higher security communication network. A WOWT device is necessary to ensure the security of communication passing from the lower security device to the higher security communication network. In FIG. 2, the first device 105 has a direct, physical connection through a wearable one way transfer ("WOWT") device 109 to a second device 115, that is connected to a higher security communications network, 117 for example, an NSA-certified tactical communications network ("tactical network"). In one embodiment, the first device 105 is a PDA or other communication device that can be easily carried by a dismounted soldier. In one embodiment, the first device 105 is a police or first responder radio that transmits unclassified voice and data. In one embodiment, the first device 105 generates GPS positioning of the radio (and presumptively of the individual carrying the radio). In some embodiments, for example, the data and voice transmission are AES encrypted. In some embodiments the second device is a Type 1 radio, for example a PRC-152 Tactical Radio/MBITR. And in some embodiments the second device 115 is any NSA-certified communication device suitable to be carried by a dismounted soldier. The WOWT device 109 is necessary to allow the first device 105 to be directly connected to the second device 115 and a tactical network 117. In one embodiment of the present invention, the WOWT device 109 and the first device 105 are incorporated into a single device 150, also allowing for point-to-point communication between the first device, that is part of a lower security communications network, and the second device 115, that is part of a tactical network.

In another embodiment, the WOWT device is physically distinct from the first device 105. In FIG. 2, multiple dismounted soldiers can each carry their own radios 101. The radios 101 transmit 103 unclassified voice and data to a first device 105, which can be carried, for example by a lieutenant or captain who is commanding a company of dismounted soldiers. In one embodiment the radios 101 are Type 3 radios, also known as first-responder radios that are utilized by fire and police stations in the U.S. In some embodiments, radios 101 can be any communication or data transfer device that is sized such that it does not significantly add to the equipment weight and size of the dismounted soldiers. Radios 101 in some embodiments are also commercially available, off-the-shelf communication devices that include basic encryption capabilities. In one embodiment the first device 105 has the capability to receive and compile individual location information, or GPS coordinates, transmitted by the radios 101. The first device is selected based on size and weight so as not to add unnecessary bulk and weight to a dismounted soldier's equipment requirements. The first device 105 can have many of the capabilities of a small computer. For example, in some embodiments the first device may run WINDOWS Mobile by Microsoft. In one embodiment the first device has Wi-Fi capabilities, a digital camera, and voice and data transmission capabilities. In addition, in some embodiments the first device is a commercial, off-the-shelf communications device that can be easily replaced if lost, stolen, or broken. In some embodiments the first device will conform to military requirements for drops, vibrations, humidity, altitude, and temperature. In some embodiments the first device is waterproof. In one embodiment the first device 105 is a PDA. One example of a PDA that could be used is a TDS Ruggedized Nomad PDA. In some embodiments, however, a dismounted soldier can use a laptop computer as the first device. The radios 101 can also transmit the individual location identifiers, or GPS coordinates of each individual soldier. In some embodiments the voice, and data, including the GPS coordinates, can be received and compiled by the first device 105. After the first device 105 has received and compiled data, the data can be transmitted from the first device 105 to the WOWT 109 through a first serial path 107. The formatted data is then transmitted from the WOWT device 109 through a second serial communication path 111 to the second device 115 that is part of a higher-security, tactical communications network 117.

Figure 3:
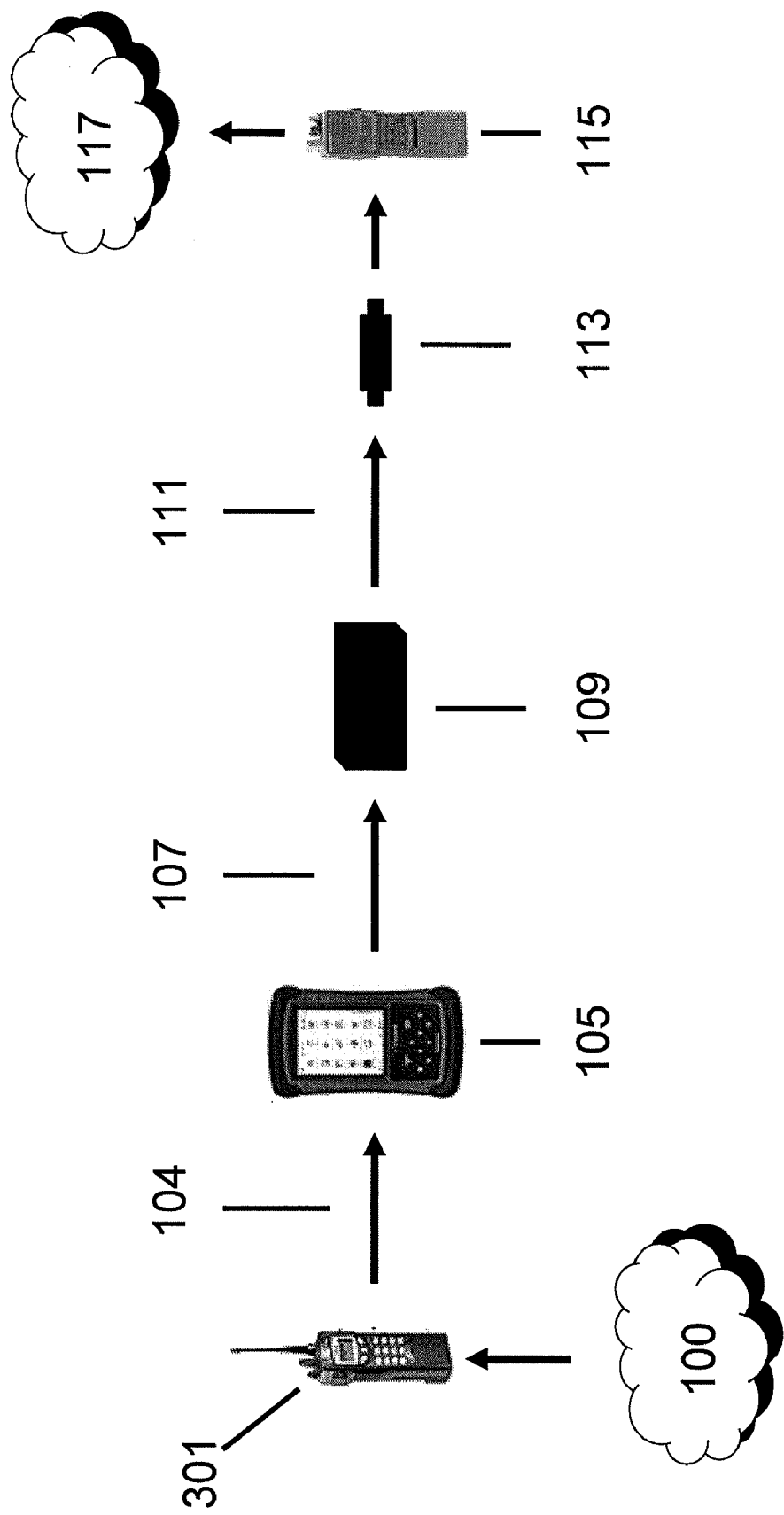
FIG. 3 shows the WOWT used in an alternative system set-up.

In FIG. 3, the first device 105 is coupled to a single radio 301 which is part of the lower-security level communication network 100. In some embodiments the first device receives data through a physical data connection 104 between the first device 105 and the coupled radio 301. In some embodiments, when the first device 105 is coupled to a radio 301, all the data transported from the lower-security level communication network 100 is transmitted to the radio 301 before being transmitted through the data connection 104 to the first device 105. The lower-security communications network 100 can include the one or more other radios 101 that are carried by dismounted solders as shown in FIG. 2. The radio 301, in FIG. 3, that is physically coupled to the first device 105 also can be used as the radio for the owner of the first device, for example the squad leader, in the lower-security level communication network 100. In some embodiments the first device 105 sends a request out through the connected radio 301 to collect any of the data, for example GPS coordinates, from one or more other radios 101 that are part of the network 100. In some embodiments, one or more radios 101 respond to the query by sending the requested data to the radio 301 that is coupled to the first device 105. In some embodiments, the data is sent from one or more radios 101 to the radio 301 that is coupled to the first device 105 on a predetermined time schedule, and without the initial query.

After the first device 105 has received and compiled data, the data can be transmitted from the first device 105 to the WOWT 109 through a first serial path 107. The first serial path 107 connects to the low-side 402 of the WOWT because it is connected to the lower-security level communication network 100. In one embodiment the data is transmitted from the first device to the WOWT device 109 in a standard serial protocol. In one embodiment the standard serial protocol is a RS-232 serial protocol format. In one embodiment the serial format is formatted in an American Standard Code for Information Interchange (ASCII) serial communications protocol. In one embodiment the ASCII, serial communications protocol conforms to NMEA specifications. In one embodiment the transmitted data is encrypted. In one embodiment the transmitted data is not encrypted. In one embodiment the information flow for the first serial path is unidirectional to prevent data from being transmitted to the first device from the WOWT device 109. The unidirectional transmission capabilities of the first serial path 107 is a security mechanism selected to prevent information from being passed back to the first device 105. This security mechanism helps to prevent security breaches in case the first device and the WOWT device are compromised, lost, or stolen.

In some embodiments, data is formatted to conform to preexisting rules once the data is transmitted from the first device 105 to the WOWT device 109. The formatted data is then transmitted from the WOWT device 109 through a second serial communication path 111 to the second device 115. In one embodiment the data is transmitted from the WOWT device 109 to the second device 115 in a standard serial protocol. In one embodiment the serial format is formatted in an American Standard Code for Information Interchange (ASCII) serial communications protocol. In one embodiment the ASCII, serial communications protocol conforms to NMEA specifications. In one embodiment the transmitted data is encrypted. In one embodiment the encryption format is not encrypted. The second serial path 111 connects to the high-side 404 of the WOWT device 109 because it is connected to the higher-security level tactical network 117. Once the formatted data is transmitted to the second device 115, it can be further transmitted over the tactical network 117 which is monitored and accessible to the entire military chain of command.

In some embodiments a radio adapter 113 is necessary to allow for proper transmission between the WOWT device 109 and the second device 115. The radio adapter can be for example, a Smartronix RDA.

The design and implementation of the WOWT device 109 is necessary to allow for the point-to-point communication between the lower-security first device 105 and higher-security, tactical network 117. Since the WOWT device allows direct communication between unsecured radios 101 and the tactical network 117, and is worn or carried by soldiers engaging in combat missions and traveling outside of secure areas, the WOWT device requires several design elements that are not necessary when one-way transfer capabilities are executed using a system maintained in a stationary, secure location, like a secure military base. FIGS. 4A-4C show several of the views of one embodiment of the present invention.

FIG. 4A shows a top view of one embodiment of the WOWT chassis 415. The WOWT chassis 415 is the exterior shell of the WOWT device 109. In FIG. 4A, the WOWT chassis 415 is designed to add minimal size and weight to the equipment requirements of a dismounted soldier. In one embodiment, the WOWT chassis 415 is approximately 5 inches to approximately 10 inches long, approximately 1 inch to approximately 5 inches wide, and approximately 0.5 to approximately 3 inches in height. In some embodiments the WOWT device conforms to military requirements for drops, vibrations, humidity, altitude, and temperature. In some embodiments the WOWT device is waterproof. In one embodiment the WOWT chassis 415 is made of a material that conforms to military requirements and is capable of holding-up to the activities and treatment expected during soldiers' field operations and maneuvers. In one embodiment, the WOWT chassis 415 is formed of milled ABS thermoplastics. In one embodiment the WOWT chassis 415 is formed of a metal, and in some embodiments the WOWT chassis 415 is formed of high impact plastic.

The WOWT chassis 415 can include a battery, or power source, compartment 420. In one embodiment the power source, which can be for example provided by one or more batteries, is enclosed within the battery compartment 420. In one embodiment the battery compartment 420 is user-accessible to allow for the replacement of the power supply as needed. In one embodiment the power supply may be two AA batteries. In one embodiment the power supply provides power of about 400 mAh to about 3000 mAh. In one embodiment the power supply can support 2.0-5.5 volt battery pack voltages. In some embodiments the power supply is designed to power the WOWT device for at least 8 to 10 hours. In some embodiments the power supply includes a reset supervisor that erases the critical memory, which in some embodiments can include sensitive or classified information, if the WOWT loses power or is turned off. And in some embodiments the power supply provides a low battery warning through indicators or displays positioned on the WOWT chassis 415.

A processing, or computing, system of the WOWT device which process the transmitted messages is contained within the WOWT chassis 415 in an enclosed PCB compartment 422, that is separate from the battery compartment 420. In one embodiment the enclosed PCB compartment 422 is sealed and not easily accessible by users. In one embodiment the processing unit in the PCB compartment 422 is designed to erase or destroy all critical information within the WOWT if the PCB compartment 422 is opened or compromised during operations. In some embodiments the reset supervisor, discussed above, is also responsible for erasing the WOWT memory if the processing system is compromised or tampered with.

The WOWT chassis 415 can include external connectors that connect the WOWT device to the first device 105 and the second device 115. In FIG. 4A the WOWT chassis 415 includes a first connector 410 that can include a first serial port and a second connector 412 that can include a second serial port. In one embodiment the first connector is also called a low-side connector. In one embodiment the first connector can be a DB9 female RS-232 asynchronous 3-wire connector for connecting, for example, to a Type 3 radio. In some embodiments, the first connector 410 can be any industry standard serial port, shown for example in FIG. 4B. In one embodiment, the first connector 410 can allow for easy connectivity to the first device, for example a PDA. In one embodiment the second connector is also called a high-side connector that can be, for example, a Hirose 3500 series connector with pins for a RS-232 asynchronous 5-wire interface. In one embodiment the second connector 412 can include pins to support a JTAG interface for configuring the processing system component of the WOWT. In one embodiment the second serial port and connector supports RTS/CTS for push-to-talk mechanisms. In some embodiments this push-to-talk modality is available in asynchronous mode only. In one embodiment the connectors include a weather-resistant cover.

And in some embodiments the first connector and the second connector are connected to universal asynchronous receiver/transmitters (UART). In some embodiments the first serial port is only compatible with the first (low-side) connector 410 and the second serial port is only compatible with the second (high-side) connector 412. The second connector 412 includes a custom cable and is connected to a custom serial port. The use of a custom serial port and custom cable is a security feature designed to prevent an unintended user from uploading/transmitting classified information from the WOWT device or downloading information to the WOWT device if the WOWT lost, stolen, or tampered with. In some embodiments the second serial communications path 111 has bi-directional transmission capabilities. And in some embodiments the second serial communications path 111 has single directional transmission capabilities. In some embodiments, the second serial port is configured to couple to second connectors with multiple pin arrangement. In some embodiments, the second connector used to connect the WOWT to a secured computer has a custom pin arrangement that allows bi-directional transmission capabilities. The bi-directional transmission capabilities allows the WOWT to download and upload data and information with a secured computer. In some embodiments, when the WOWT is connected to the second device the pin assembly of the second connector only allows for data transmission from the WOWT to the second device, and does not allow data transmission from the second device to the WOWT.

In one embodiment the WOWT device will receive data transmitted in a serial format and transmit data in a serial format. One example of the serial format is RS-232 format. In one embodiment the connectors or serial ports can support a range of transmission rates of 2400-57600 bits per second (bps). In some embodiments the serial ports can support transmission rates ranging from 2400-3200 bps, in some embodiments the serial ports can support transmission rates ranging from 3200-9600 bps, in some embodiments the serial ports can support transmission rates ranging from 9600-19200 bps, and in some embodiments the serial ports can support transmission rates ranging from 19200-57600 bps. In some embodiments the first and second serial ports can support the same transmission rate of data, and in some embodiments the first serial port and the second serial port can support different rates of transmission.

Figure 5:
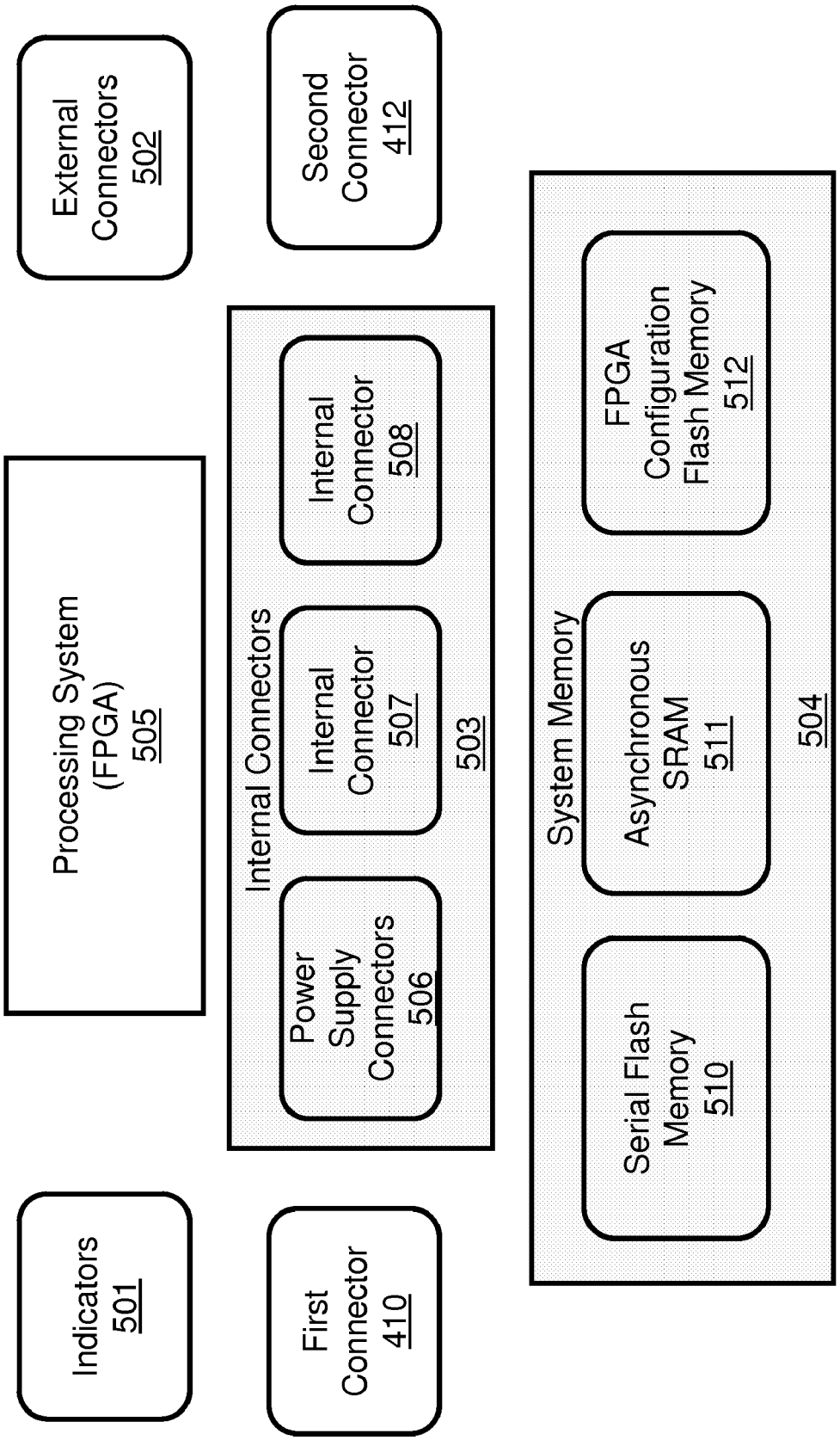
FIG. 5 shows a diagram of the functional components of a WOWT.

The WOWT device can also include additional functional components, shown in FIG. 5, including indicators 501, additional external connectors 502, internal connectors 503, memory 504, and a processing system 505. The functional components of the WOWT device, except for the power supply, are contained within the PCB compartment 422 of the WOWT chassis.

The WOWT device includes indicators 501 on the outside of the WOWT chassis 415. In one embodiment the indicators can be status indicators that are LEDs positioned on the exterior of the WOWT chassis. In one embodiment the LED indicators show power on. And some embodiments can include LED indicators to show low battery levels.

In addition to the first connector 410 and the second connector 412, discussed above, the WOWT device can include external connectors 502 that are used to transmit data and instructions from the high-security tactical network onto the WOWT on-chip memory. In some embodiments the external connectors can include a JTAG breakout. In one embodiment the JTAG breakout is a custom cable connection that connects the WOWT device to a general purpose computer that can download data and instructions to the WOWT device memory 504 and processing system 505. In one embodiment the WOWT device input/output apparatus can also include a general purpose input/output connector. In one embodiment the general purpose connector can be used to download code to non-volatile memory that is used to initialize the processing system contained in the WOWT device and load the operating system.

The WOWT device can also include one or more internal connectors 503. In some embodiments an internal connector is a power supply connector 506 that connect the memory and processing systems to the power supply. An internal connector 507 can also be a transmitting connector that transmits data from the first connector 410 to the processing system and from the processing system to the second connector 412. In one embodiment an internal connector 508 connects the FPGA 505 with the system memory 504.

The WOWT device can also include different forms of memory storage 504. It contains general operating parameters as well as highly classified rules and encryption codes utilized by the WOWT processing system in formatting data to be transmitted to the tactical network 117. In one embodiment the WOWT memory can also include serial flash memory 510, asynchronous SRAM 511, and FPGA configuration flash memory 512. The FPGA configuration flash memory can be memory loaded from a general purpose computer connected through the second connector. The FPGA configuration flash memory can include data related to preselected rules that govern whether data received through the low-side connector is transmitted through the high-side connector including selected areas of operation coordinates and encryption keys. SerialFlash memory is retained by the WOWT regardless of whether power is maintained in the WOWT. In one embodiment, sensitive or classified information is not kept in the SerialFlash memory as a security measure. The asynchronous SRAM memory is lost if power is lost in the WOWT.

Figure 6:
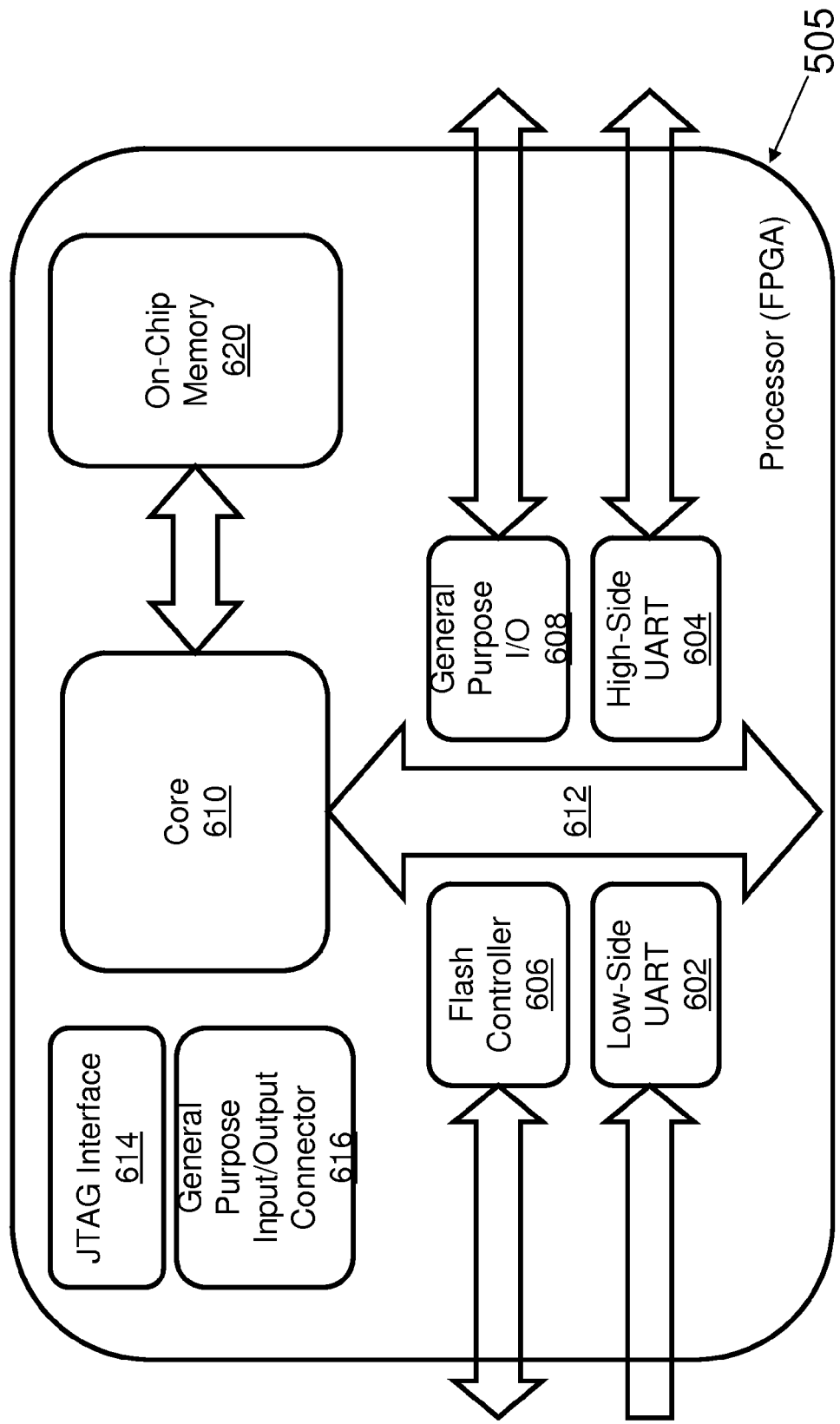
FIG. 6 shows an embodiment of a field programmable gate array that embodies the WOWT system-on-a-chip.

The WOWT processing system 505 performs the processing and computing functionality required by the WOWT device. In some embodiments the processing system of the WOWT includes a processing core 610, on-chip memory 620, and all necessary internal connections can be contained on a single chip, shown in FIG. 6. In some embodiments, the processing system is contained on more than one chip. Less power is required when the processing core and the memory is situated on a single chip than when the memory and the processor core are situated on separate chips. In one embodiment, the on-chip memory can be 48 Kbytes.

The WOWT processing system 505 can include a processor core 610. In one embodiment the processor core is a Nios II processor running at 25 MHz. In some embodiments the processor core 610 is a field programmable gate array (FPGA) that can be programmed as needed by downloading data and instructions from a general purpose computer to the WOWT through a JTAG interface 614. In some embodiments the processor core 610, or FPGA, can be updated by downloading new or updated rules by connecting the WOWT to a secured, general-purpose computer through a general purpose input/output connector 616. The preselected rules are selected to enhance the security of the messages that are transmitted through the WOWT. The preselected or preset rules determine the validity of data and messages that the first device transmits to the WOWT device to be transmitted to the second device and then through to the classified second network. The preset rules also prevent the transmission of inaccurate or incomplete messages in some embodiments.

Internal connectors transmit data that is received and sent from the WOWT device through the processing core 610. The data received from the lower-security network can be received through a low-side universal asynchronous received/transmitter (UART) 602, and once the data is formatted and processed by the processor core it can be transmitted to the higher-security network through a high-side UART 604. In some embodiments the processing system 505 can also include a flash controller 606 and a general purpose input/output (I/O) 608. In some embodiments data is transmitted to and from the processing core 610 from the low-side UART, the high-side UART, the flash controller, and the general purpose I/O through the use of a peripheral bus 612.

Figure 7:
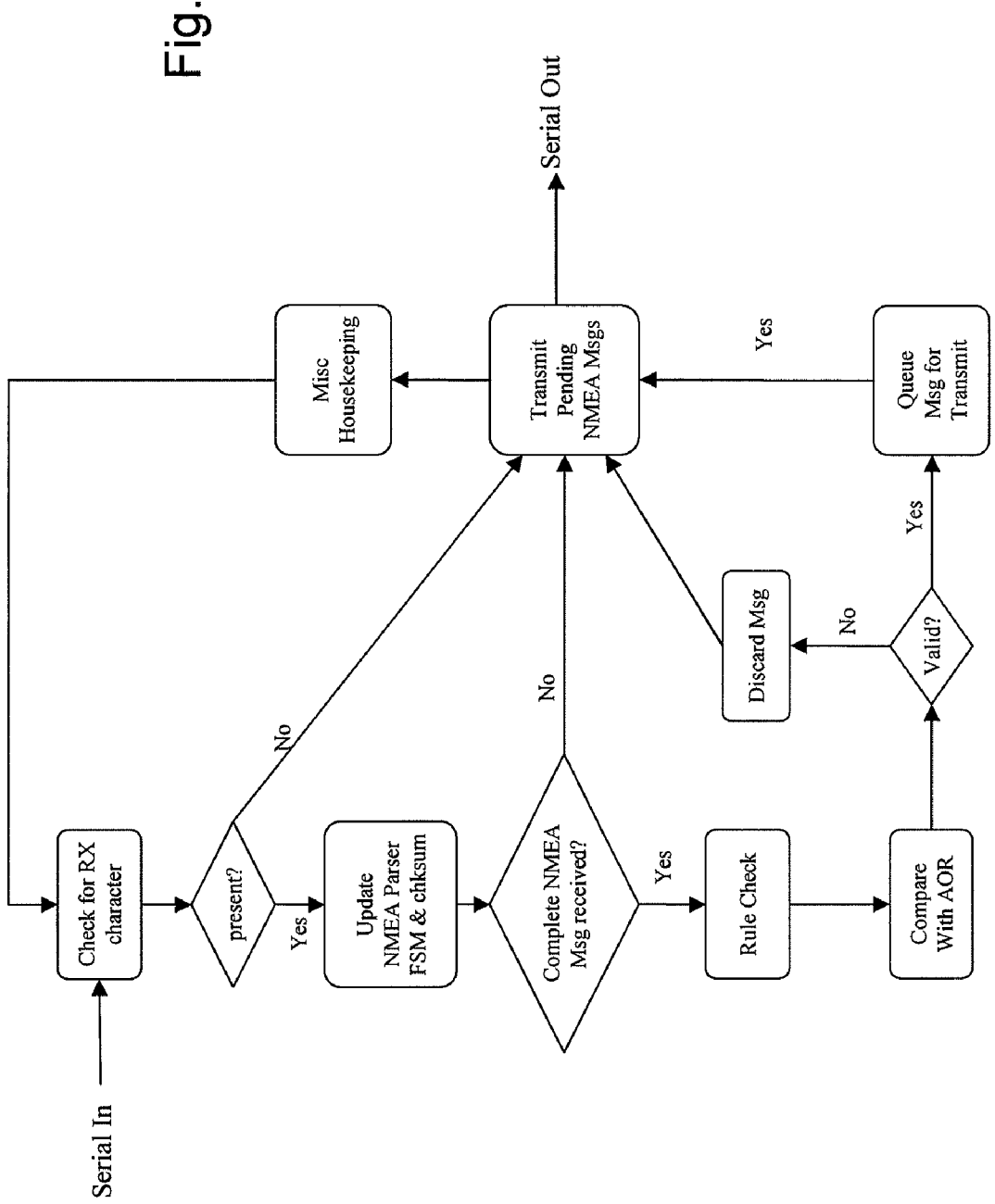
FIG. 7 shows an example of a software processing loop used in an embodiment of the WOWT.

FIG. 7 shows a WOWT processing loop executed by the FPGA and associated with the transmission of a message including the incorporation of the preset rules in the processing loop. In one embodiment, computer readable information enters the processing loop after the FPGA is configured and the area of operation coordinates are established. The receiver of the WOWT then starts to look for the start of the formatted data. In one embodiment the data is formatted according to an American Standard Code for Information Interchange (ASCII) serial communications protocol. In one embodiment the ASCII, serial communications protocol conforms to NMEA specifications, i.e., as a NMEA sentence. In some embodiments the WOWT device receiver starts to look for the beginning of the NMEA sentence and stores the received characters in a buffer until the end of the sentence is received. Once the NMEA checksum is validated, the transmitted coordinates are compared to the preselected area of operations coordinates. If the checksum does not match or if the transmitted area of operation coordinates fall outside the preselected area of operation coordinates, the message is formatted in an unsupported type, the illegal or unexpected characters are found in the NMEA sentence, then the message is rejected and not transmitted further. In some embodiments, the message is also rejected, or not transmitted from the WOWT if only a partial message is received within a preselected time period and the message effectively times-out. If a complete message is received and the message is not rejected because of checksum error, and the area of operation coordinates are valid, the message will be queued for transmission and a serial message will be transmitted through the second serial port to the second device and through to the second communication network.

FIG. 8 shows an example of a NMEA sentence that could include the data transmitted from the WOWT device. In some embodiments, the NMEA sentence will include data corresponding to multiple fields. In some embodiments those fields 802 can include a sentence ID, the status, the universal time code, the checksum, and fields related to the GPA coordinates that are being transmitted. In some embodiments the GPS fields can include latitude, longitude, a north/south indicator, and an east/west indicator. FIG. 8 shows examples of the types of data that would correspond to each field. Finally, the complete NMEA sentence would include all of the transmitted data in a single serial sentence 804.

Figure 9:
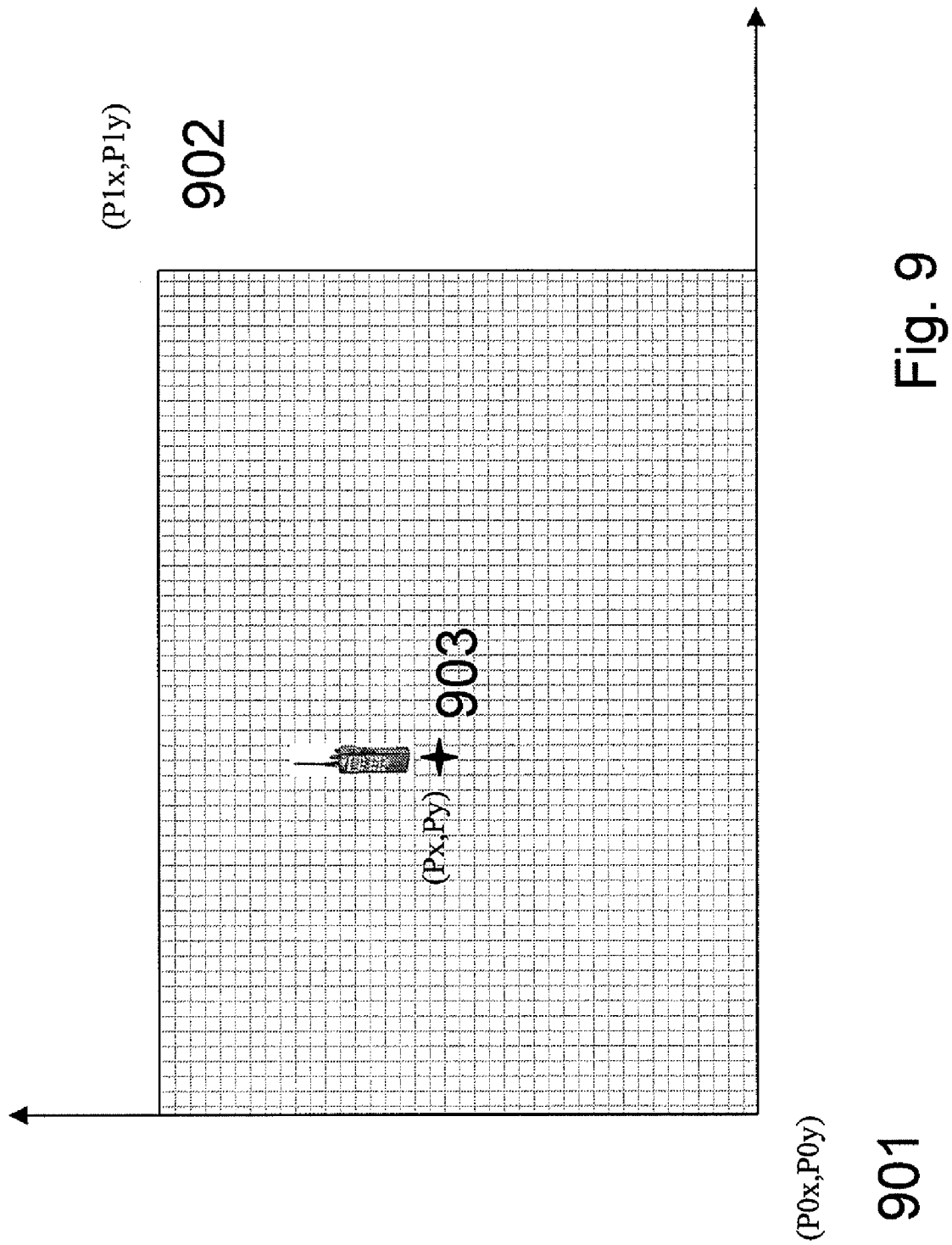
FIG. 9 shows an example of a area of operation that can be used to define a preset rule used to manage the data transmitted through the WOWT.

FIG. 9 shows one example of an area of operation that would be incorporated into the preset rules used to determine the validity of a sent message. In one embodiment the area of operations is defined by latitude and longitude coordinates 901, 902. When a dismounted soldier's radio transmits the soldier's GPS coordinates 903 to the first device and the coordinates are compiled and sent to the WOWT, the WOWT compares the soldier's GPS coordinates 903 with the coordinates 901, 902 for the expected area of operations that can be preselected based on the mission or operations to be conducted. In one embodiment, the commander of an operation may select one or more areas of operation based on a given plan or designated target.

If the GPS coordinates fall within the preselected areas of operation then the locator portion of the message is considered valid, and the data is transmitted to the second device. However, if the coordinates of the individual soldier fall outside of the preset coordinates, then the radio is considered to be compromised and the coordinates are not transmitted through the WOWT to the second communication network. The size and total number of area of operation options is selected at the beginning of the mission or operation. In one embodiment, only a single area of operations is selected. And in one embodiment, multiple options for areas of operation are selected and saved. In one embodiment the area of operation can be approximately 5,000 meters by 5,000 meters. In one embodiment the area of operation can be approximately 500 meters by 500 meters.

Because dismounted soldiers may carry out maneuvers and operations for several days or even weeks away from an established, secure base, the memory and the FPGA contained in the WOWT device is designed to be easily updated and programmed by downloading information from a secured general purpose computer that is part of the higher-security, second communication network. In one embodiment the field programming of the WOWT device downloads encryption keys, and in some embodiments new areas of operation can be selected and downloaded. In some embodiments the FPGA and memory can be updated on a daily basis thereby minimizing any potential security risks because the WOWT device can store the sensitive information necessary to execute only the immediate maneuver or operation. To field program the WOWT device, a general purpose computer (not shown) can be running a processing system, for example, Windows XP by Microsoft. In one embodiment the computer has FPGA programming tools installed including the Quartus II 8.0 sp1 Programmer application. A cable is then connected between the external connector of the WOWT and the PC serial port. In some embodiments the cable is a custom cable. In some embodiments the FPGA programming process can include two steps. In the first step a user runs the FPGA programmer contained in the general purpose computer, and the FPGA core is uploaded via the external connector. In some embodiments the external connector is the JTAG interface. The FPGA boots up and enters a preselected rules download mode. In some embodiments the preselected rule is the area of operations coordinates. In some embodiments the user can send the area of operations coordinates over the high side serial port. In some embodiments the preselected rules are formatted in a serial format, for example in a NMEA-like sentence. Other rules can also be transmitted to the high side serial port in a similar fashion. In some embodiments if a valid preselected rule instruction is not received within a timeout period, the FPGA programming download will halt to prevent inaccurate or incomplete uploading of the preselected rule. In some embodiments the new rules information, or configuration, is stored in the volatile memory. After the new configuration is uploaded any old rules configuration stored in the volatile memory of the processing system is completely overwritten. In some embodiments the new configuration also overwrites old configurations that are the result of tampering. In one embodiment, because any current configuration is stored in volatile memory, the rules configuration is destroyed when the WOWT is powered-off or when the WOWT loses power because of a low or depleted battery. In some embodiments classified information, for example the configurations are stored only in the volatile memory, there is no classified information storage in the non-volatile memory.

The present invention also includes methods of transmitting information from a first communications network to a second communications network. In one embodiment the first communications network is a lower security network and the second communications network is a higher security network. The method of transmitting data can include receiving data from a first device through a first serial communication path. In some embodiments the data is global positioning data, or GPA coordinates associated with one or more dismounted soldiers. In some embodiments the data can also include voice transmissions, digital photographs, text messages, or emails. The method can further include formatting the global positioning data into a serial communication format that conforms with, for example, the ASCII serial communications protocol. In one embodiment the ASCII, serial communications protocol conforms to NMEA specifications, i.e., as a NMEA sentence. The first serial communications path can be connected to a means for formatting the data. In some embodiments, the means for formatting the data can include the WOWT device and components described above. In some embodiments the first serial communications path can be unidirectional such that the data can not be transmitted from the WOWT device, along the first serial communications path to the first device. After formatting the data, the method can further include confirming that the formatted global positioning data conforms to preset rules; and finally transmitting the formatted data through a second serial communication path to a second device that is part of a second network.

While the invention has been particularly shown and described with reference to specific embodiments, other aspects of what is described herein can be implemented in other suitable systems known to those of ordinary skill in the art. It should be understood by those skilled in the art that various changes in form and detail may be made without departing from the spirit and scope of the invention as defined by the appended claims.

What is claimed is:

1. A component for use in a communications system comprising:
    a first device coupled to a first communication network that receives and compiles global positioning data corresponding to the physical location of one or more objects;
    a first serial communication path for transmitting the global positioning data from the first device, the first serial communications path being unidirectional to prevent data from being transmitted to the first device;
    means for formatting the global positioning data received from the first serial path into a serial communication format, the means for formatting the global positioning data is disposed within the first device;
    a second serial communication path for transmitting the formatted global positioning data to a second device associated with a second communication network; and
    user replaceable means for providing power to the means for formatting the global positioning data.

2. The component of claim 1 wherein the second serial communications path is a two way transfer path that allows data to be transmitted in two directions between the means for formatting the global positioning data and the second communications network.

3. The component of claim 1 wherein the means for formatting the global positioning data is a field programmable gate array.

4. The component of claim 1 wherein the user replaceable means for providing power is one or more batteries of about 400 mAh to about 3000 mAh.

5. The component of claim 1 wherein the global positioning data corresponds to the position of a single individual.

6. The component of claim 5 wherein the global positioning data of a single individual is transmitted to the second communication network.

7. The component of claim 1 wherein the encrypted global positioning data is formatted in an American Standard Code for Information Interchange (ASCII) serial communication protocol.

8. The component of claim 7 wherein the ASCII, serial communication protocol conforms to NMEA specifications.

9. The component of claim 1 wherein the formatted global positioning data conforms to preset rules.

10. The component of claim 1 wherein the first device is a personal digital assistant (PDA).

11. A point to point communication system comprising:
a first device coupled to a first communication network transmits data;
a first serial communication path for receiving the data from the first device, the first serial path being unidirectional to prevent data from being transmitted to the first device along the first serial communication path;
means for formatting the data received from the first device through the first serial communications path into a serial communication protocol, the means for formatting the global positioning data is disposed within the first device;
a second device coupled to a second communication network;
a second serial communication path that transmits the formatted data from the means for formatting to the second device; and
user accessible means for providing power to the means for formatting the data.

12. The point to point communications system of claim 11 wherein the first device receives and compiles data from one or more devices that are part of the first communications network.

13. The point to point communication system of claim 11 wherein the first device is a personal digital assistant (PDA).

14. The point to point communication system of claim 11 wherein the second device is a Type 1 Radio.

15. A system comprising:
a first device coupled to a first communication network, the first device comprising:
a first serial communication path for transmitting data received at the first device from the first communication network, the first serial communications path being unidirectional to prevent data from being transmitted from the first device to the first communication network;
means for formatting the data received from the first communications network into a serial communications format, the means for formatting the global positioning data is disposed within the first device;
a second serial communications path for transmitting the formatted data from the means for formatting the data;
a user accessible means for providing power to the means for formatting the data; and
a second device coupled to a second communication network, the second device comprising:
a means for receiving the formatted data from the second serial communications path of the first radio; and
a means for transmitting the formatted data to the second communication network.

16. The system of claim 15 wherein the data comprises global positioning data that corresponds to the physical location of one or more individuals.

17. The system of claim 15 wherein the formatted data conforms to preset rules.

\* \* \* \* \*